Sept. 9, 1924.
A. AVERY
SPEEDWAY
Filed May 26, 1923
1,507,723
2 Sheets-Sheet 2
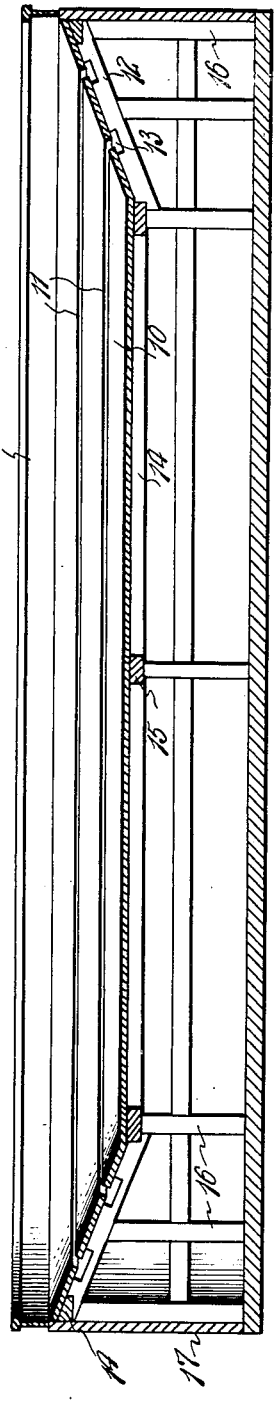
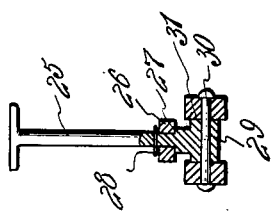
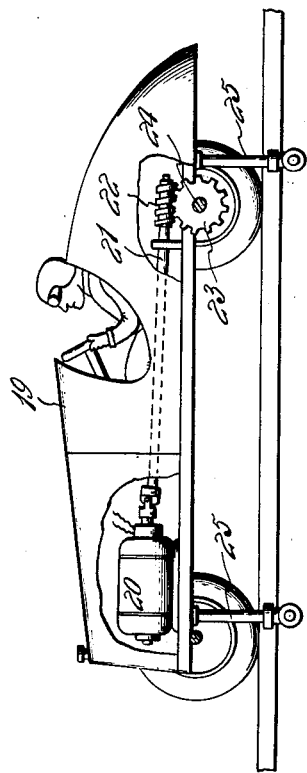
INVENTOR
A. Avery
BY Victor J. Evans
ATTORNEY
WITNESS:

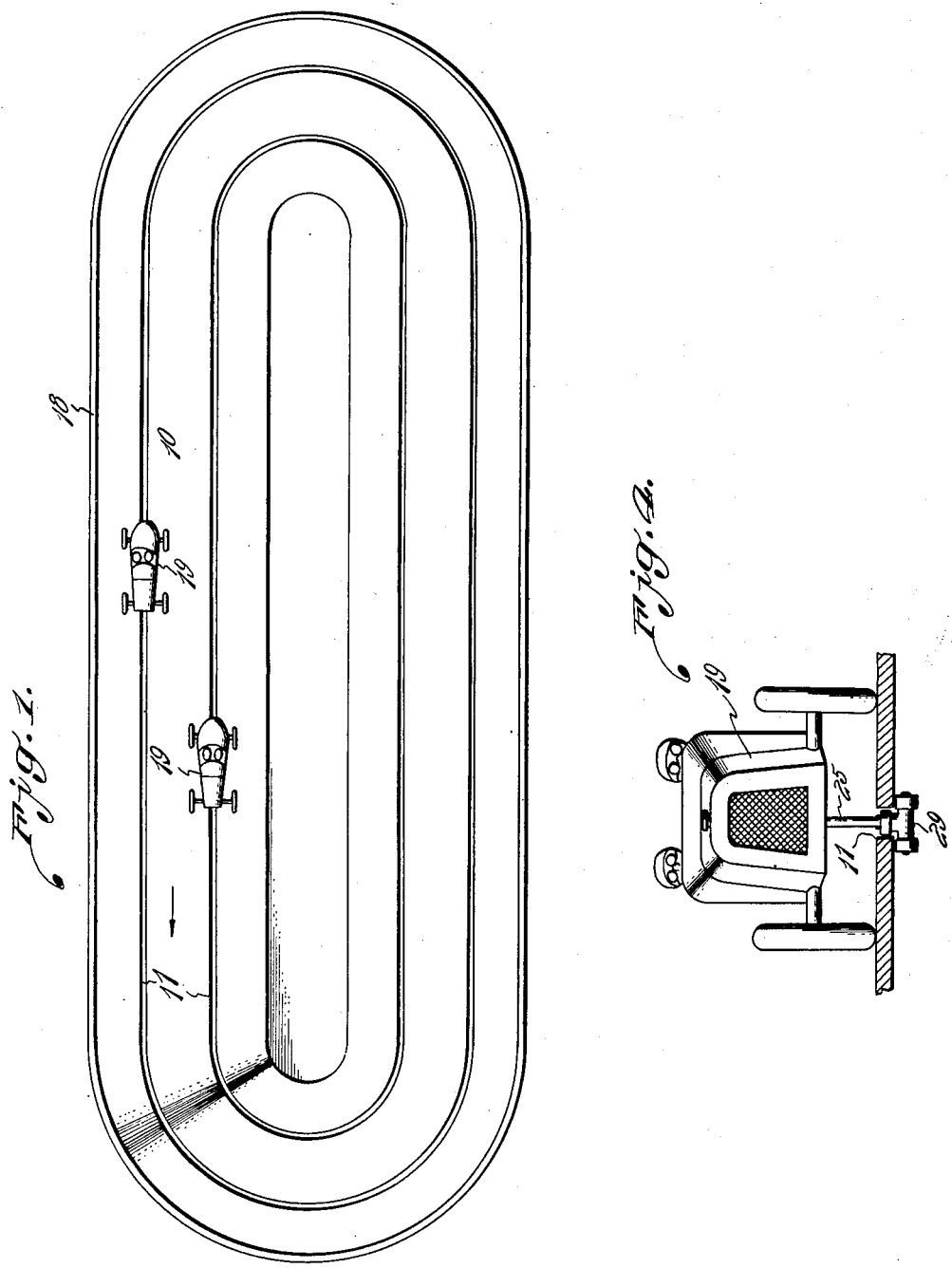

Patented Sept. 9, 1924.

1,507,723

UNITED STATES PATENT OFFICE.

ANTHONY AVERY, OF ROYAL OAK, MICHIGAN.

SPEEDWAY.

Application filed May 26, 1923. Serial No. 641,784.

*To all whom it may concern:*

Be it known that I, ANTHONY AVERY, a citizen of the United States, residing at Royal Oak, in the county of Oakland and State of Michigan, have invented new and useful Improvements in Speedways, of which the following is a specification.

This invention relates to improvements in amusement devices and has for an object the provision of a speedway upon which are adapted to travel a number of vehicles.

Another object of the invention is the provision of a speedway of novel construction which includes a platform having a plurality of spaced annular slots therein.

Another object of the invention is the provision of novel means carried by the vehicles and extending through the slots for guiding and holding the vehicles upon the platform.

With the above and other objects in view, the invention further includes the following novel features and details of construction, to be hereinafter more fully described, illustrated in the acompanying drawings and pointed out in the appended claim.

In the drawings:—

Figure 1 is a plain view of the invention.

Figure 2 is a vertical longitudinal sectional view thereof with the vehicles removed.

Figure 3 is a fragmentary view on an enlarged scale showing one of the vehicles in side elevation and partly broken away.

Figure 4 is a fragmentary transverse sectional view.

Figure 5 is a detail view partly in section showing one of the vehicle carried arms.

Referring in detail to the drawings, wherein like characters of reference denote corresponding parts, the invention includes a platform which is substantially dish-shaped and includes a number of spaced annular sections 10 which provide slots 11 between them. The sections are supported by a structure which includes transversely arranged upwardly and outwardly inclined beams 12 having notches 13 beneath the sections 10. These beams are connected by longitudinal and transverse beams 14 and 15 and all of said beams are supported by means of uprights 16. The entire structure is preferably arranged within a housing 17 and is surrounded by a rail 18.

The vehicles which travel over the speedway or platform may be of various types, the ones shown being indicated at 19. The vehicles are driven preferably by means of an electric motor 20 which may receive current from any suitable source. This motor has connected thereto one end of a driving shaft 21 whose opposite end is provided with a worm 22, the latter driving a worm gear 23 mounted upon the rear axle 24 of the vehicle.

Extending downwardly from the vehicles at the front and rear ends thereof are arms 25 which are substantially in the shape of an inverted T. These arms have their upper ends secured to the vehicle and have mounted thereon adjacent their lower ends horizontally disposed rollers 26 which engage the opposite side walls of the slots. These rollers bear against shoulders 27 and are held in place by means of pins 28. The lower extremities of the arms 25 are each provided with a head 29 which has extending therethrough an axle or pin 30 upon which is mounted rollers 31. These last mentioned rollers bear against the ends of the head and engage the under face of the platform upon opposite sides of the slots.

While the device is shown as operated by means of an electric motor, it is obvious that any other suitable power may be provided and in the event of the device being sufficiently small, a spring motor may be employed for its operation.

The invention is susceptible of various changes in its form, proportions and minor details of construction and the right is herein reserved to make such changes as properly fall within the scope of the appended claim.

Having described the invention what is claimed is:—

The combination with a plurality of vehicles and means for driving the same, of a platform having spaced slots therein, centrally located downwardly extending front and rear arms secured to the vehicle, anti-friction rollers carried by the arms for contact with the side walls of the slots and anti-friction devices carried by the arms and located upon opposite sides of and below the first mentioned anti-friction devices for contact with the under face of the platform adjacent the slots.

In testimony whereof I affix my signature.

ANTHONY AVERY.